(12) United States Patent
Suen (10) Patent No.: US 7,100,537 B1
(45) Date of Patent: Sep. 5, 2006

(54) IONIC PET GROOMER

(76) Inventor: Chi Ming Suen, Tohkai Precision Industrial, LTD, Good Year Industrial Blvd, 119 How Ming Street, Flat C, 6/F Kwon Tong, Kowloon 180 (HK)

( * ) Notice: Subject to any disclaimer, the term of this patent is extended or adjusted under 35 U.S.C. 154(b) by 128 days.

(21) Appl. No.: 10/870,519

(22) Filed: Jun. 16, 2004

(51) Int. Cl.
*A01K 13/00* (2006.01)

(52) U.S. Cl. .................. 119/612; 15/1.52; 132/116; 607/79

(58) Field of Classification Search ............ 119/600, 119/608, 609, 611, 612, 613, 614, 615, 625, 119/664; 607/79, 145; 15/1.51, 1.52; 132/112, 132/116, 119.1, 120, 219, 313
See application file for complete search history.

(56) References Cited

U.S. PATENT DOCUMENTS

| | | | | |
|---|---|---|---|---|
| 4,632,135 A | * | 12/1986 | Lenting et al. | 132/313 |
| 5,957,090 A | * | 9/1999 | Larson | 119/600 |
| 6,191,930 B1 | * | 2/2001 | Ramchandani | 361/213 |
| 6,336,428 B1 | * | 1/2002 | Locke | 119/625 |
| 6,588,434 B1 | * | 7/2003 | Taylor et al. | 132/116 |
| 6,672,315 B1 | * | 1/2004 | Taylor et al. | 132/116 |
| 6,827,088 B1 | * | 12/2004 | Taylor et al. | 132/116 |

* cited by examiner

*Primary Examiner*—T. Nguyen
(74) *Attorney, Agent, or Firm*—Lee W. Tower (57) ABSTRACT

A handholdable ion emitting pet grooming brush for grooming pets is provided. It includes a body having an air intake on the top side of the body. A bristle unit is removably attached to the bottom side of the body and there is an opening in the middle of the bristle unit, which opens to an air outlet trough on the bottom side of the body. The air outlet trough is adapted to be similar in dimension to the opening. An ion generator is disposed in the body for creating an air flow that travels from the air intake to the air outlet trough. The ion generator includes a high voltage pulse generator, a first electrode located below the air intake, and a second electrode located above the air outlet trough. The second electrode includes a plurality of spaced second electrodes each coupled to the high voltage pulse generator. The air flow includes ionized air traveling from the first electrode between and past the spaced second electrodes and through the opening in the middle of the bristle unit.

16 Claims, 7 Drawing Sheets

IONIC PET GROOMER

BACKGROUND OF THE INVENTION

1. Field of the Invention

This invention relates to pet grooming devices and more particularly to ion generators.

2. Description of the Related Art

It is well known in the art that ion generators can produce flow of an ionizable fluid media, such as air, without the aid of moving parts. For example, U.S. Pat. No. 3,018,394, issued to Thomas Townsend Brown on Jan. 23, 1962, and U.S. Pat. No. 2,949,550, issued to Thomas Townsend Brown on Aug. 16, 1960 disclose that when suitable voltages are applied to electrodes the medium such as air is caused to move with respect to the electrodes. Another example of the prior art is U.S. Pat. No. 4,789,801, issued to Lee on Dec. 6, 1988, which describes electro-kinetic transducers for applications including loudspeakers, and ion generators.

U.S. Pat. No. 6,042,637, issued to Weinberg on Mar. 28, 2000 describes a corona discharge device for destruction of airborne microbes, chemical toxins, and allergens. A miniature air purifier applies a high voltage to an emitter electrode located about ¼-inch from an 80% open mesh metallic grid held at ground potential. A corona discharge surrounds the emitter point and produces ionized air as well as destroying pathogens and pollutants with ozone and direct electron impact decomposition. The grid attracts ionized air molecules, thereby creating a mass flow of purified air out of the device.

U.S. Pat. No. 6,672,315, issued to Taylor on Jan. 6, 2004, describes an ion emitting brush for removing lint, hair, and the like from clothing. The ion emitting brush is used to brush away lint, hair, etc. from clothing and other material and also provides a measure of cleaning and/or conditioning as well for the material.

Common pet brushes are well known in the art. Since pets vary, pet brushes are specifically designed for the particular type of pet. For example, dog brushes are significantly different than a brush used for a cat and definitely different than a horse grooming brush. This is primarily due to the different textures and lengths of the coats on these animals. There have been attempts at improving basic pet brushes. For example, U.S. Pat. No. 6,336,428, issued to Locke on Jan. 8, 2002, describes a vacuum pet brush for collecting debris loosened by a grooming brush or comb. Another example is U.S. Pat. No. 5,957,090 issued to Larson on Sep. 28, 1999, which describes a device for removing dirt, loose hair, dander, etc. from household pets. An electrostatic generator is connected a high voltage capacitor. When a pet is brought in close proximity to its surface the electrostatic force pulls dirt and loose hairs off the pet.

These pet brushes may serve their purpose; however, they do not promote the destruction of microbes, chemical toxins, and allergens that may be present on a pet. House pets are in many environments during a typical day. They are typically outside the house in the yard and when there can pick up on their coats many substances that are undesirable. Then when let into a house they bring these substances with them. Other pets such as horses are never in a house; however, they need constant grooming as they are exposed to a barnyard type environment.

Accordingly, there is a need in the art for pet groomer that can be used with different pets and destroy microbes, chemical toxins, and allergens that a pet is exposed to on a daily basis.

SUMMARY OF THE INVENTION

It is an object of the present invention to provide an ionic pet groomer that includes a pet brush and an ion generator.

It is another object of the invention to provide a brush with an ion generator, which can produce airflows containing substantial concentrations of ions.

It is a still a further object of the present invention to produce ion generation in a pet brush to maximize killing of pathogens, oxidization of toxins produced by the pathogens, detoxification of chemical pollutants, and neutralization of allergens.

Other objects and many of the attendant features of this invention will be more readily appreciated as the same becomes better understood by reference to the following detailed descriptions and considered in connection with the accompanying drawings in which like reference symbols designate like parts throughout the figures.

DETAILED DESCRIPTION

Figure 1A:
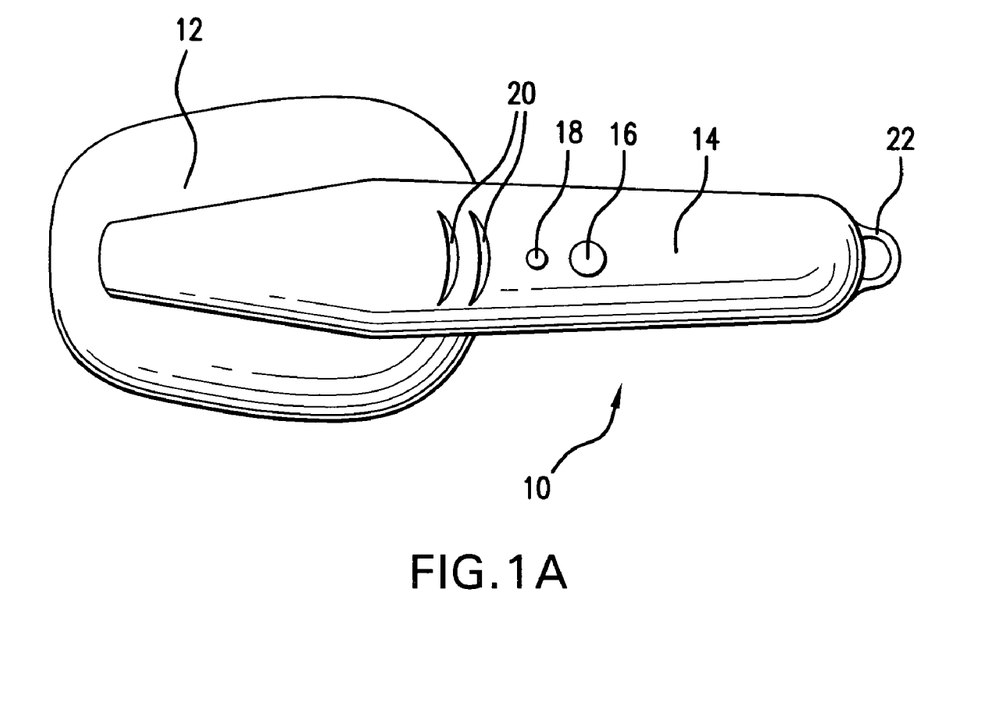
FIG. 1A is a top view of an ionic pet groomer in accordance with the present invention.
Figure 1B:
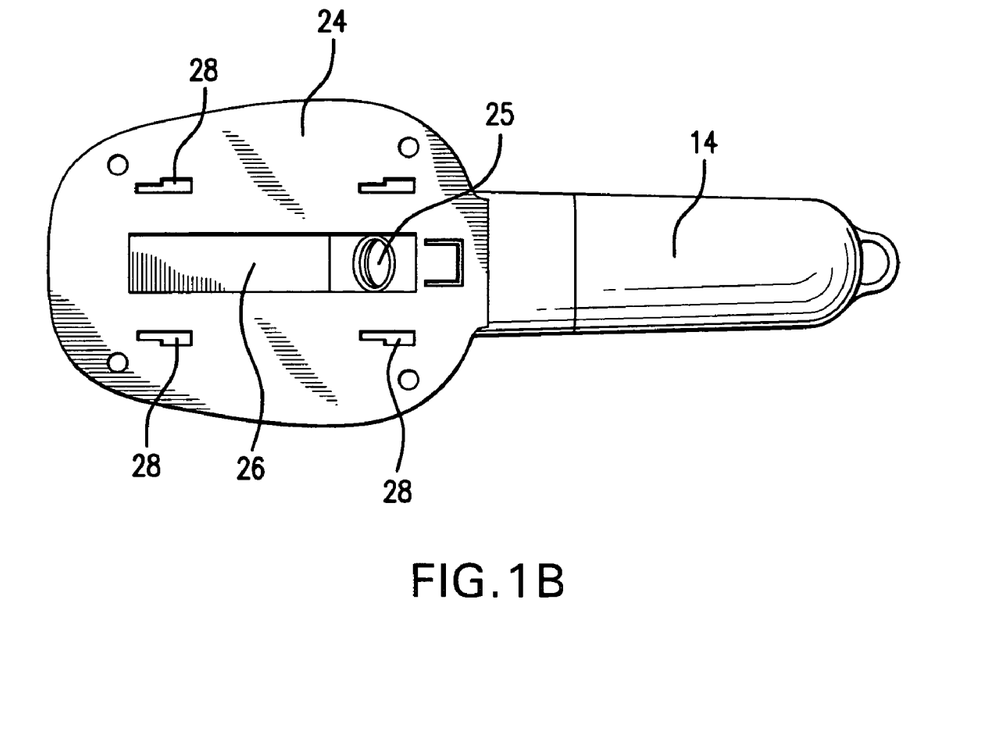
FIG. 1B is a bottom view of the base of the ionic pet groomer showing the air outlet and air outlet trough in accordance with the present invention.
Figure 1C:
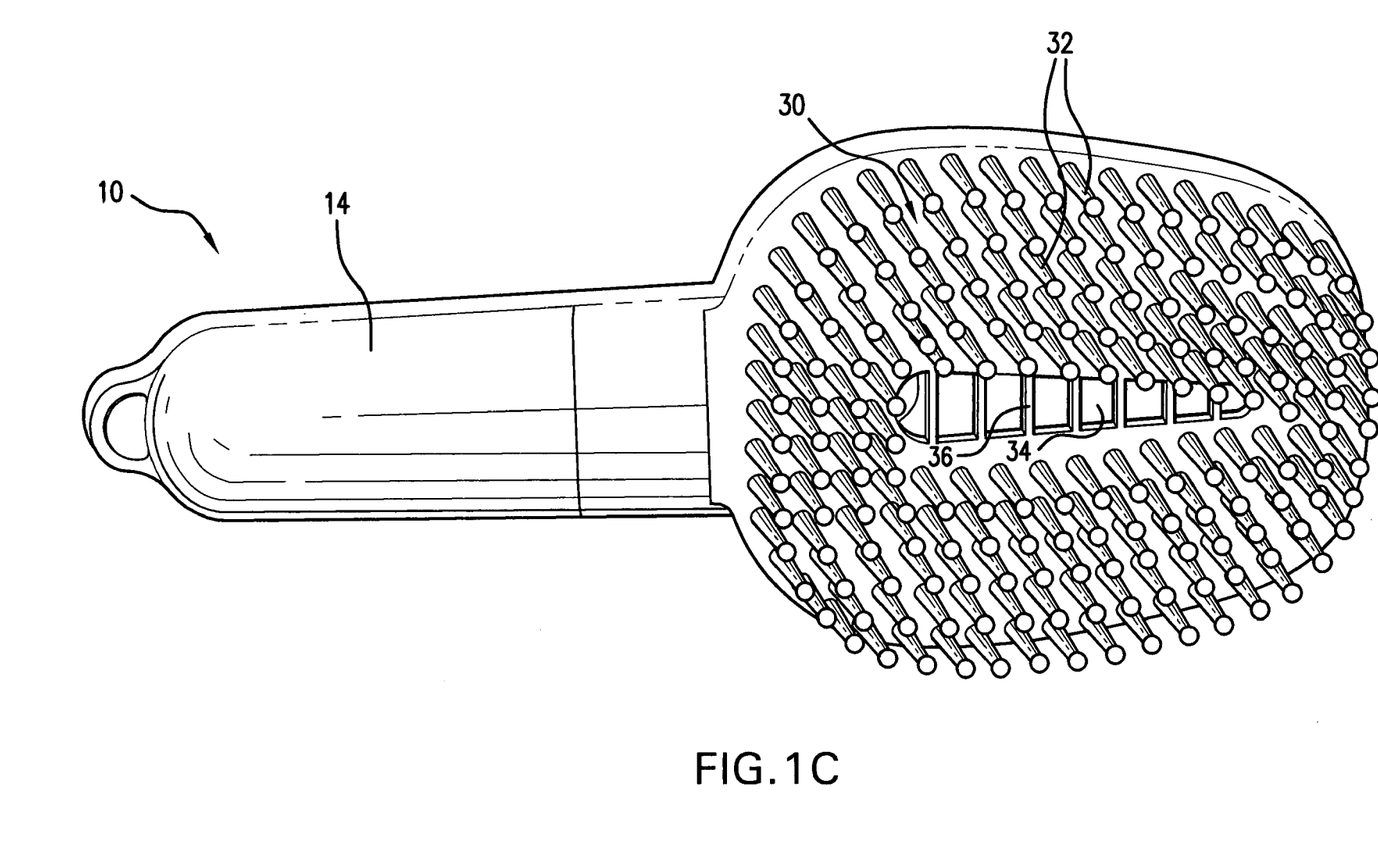
FIG. 1C is a bottom view of the ionic pet groomer showing the bristle unit with an opening to the air outlet trough attached to the base in accordance with the present invention.

Referring now to the drawings, FIG. 1A shows a top view of an ionic pet groomer 10, which includes a base 12, a handle 14, a power on/off switch 16, a power on indicator light 18, air intakes 20, and a loop 22 for storage or for a strap. FIG. 1B shows a bottom side 24 of the base 12 of the ionic pet groomer 10. Air outlet 25 provides a path for air from the air intake 20 to exit the bottom of the base 12. The air outlet opens into air outlet trough 26. Also shown in FIG. 1B are attachment points 28, which are used to removably attach bristle unit 30, as shown in FIG. 1C, to the bottom side 24 of the base 12. The bristle unit 30 has bristles 32 for grooming a pet. The bristles can be different types depending on the type of pet. The bristles used for a dog brush are different than that used for a horse, due to their different hair texture and length. An opening 34 in the middle of the bristle unit is approximately the same dimension as the air outlet trough 26. As will be explained, ionized air travels from the air intakes 20 to the air outlet 25. Then the air from the air outlet 25 is distributed to the air outlet trough 26 and through the opening 34. As shown in FIG. 1C, across the opening 34 are screen members 36, which are integral to the bristle unit and placed across the opening 34 in order to minimize debris that can enter the opening. Bristles 32 surround the opening.

The handle 14 provides a comfortable grip for the user of the ion pet groomer. It also provides a convenient location for the on/off power switch 16, the power on indicator light 18, and the loop 22.

The base 12 or body of the ion pet groomer 10 has a body length extending away from the handle 14 and a body width that is wider than the width of the handle 14. Having a wider width for the base 12 allows enough room for the bristles 32 and for the opening 34 in the middle of the bristles 32.

The air outlet trough 26 in the base bottom 24 and the opening 34 in the bristle unit 30 are each adapted to the other in order to maximize the ionized air flow through the opening 34. This adaptation includes the opening 34 and the air outlet trough 26 having similar length and width dimensions. As shown in FIG. 1C, the opening 34 in the middle of the bristle unit has a length aligned with the length of the base 12. The opening length is approximately fifty to seventy percent of the length of the base. The width of the opening is approximately ten to fifteen percent of the width of the base 12. As shown in FIG. 1C the width of the opening 34 narrows toward the far end of the base 12 away from the handle 14. Another way in which the air outlet trough 26 and the opening 34 are adapted to one another, is the tapering of the depth of the air outlet trough, which has its maximum depth near air outlet 25 and then tapers to its minimum depth near the far end of the air outlet trough 26 away from the handle 14.

Figure 2:
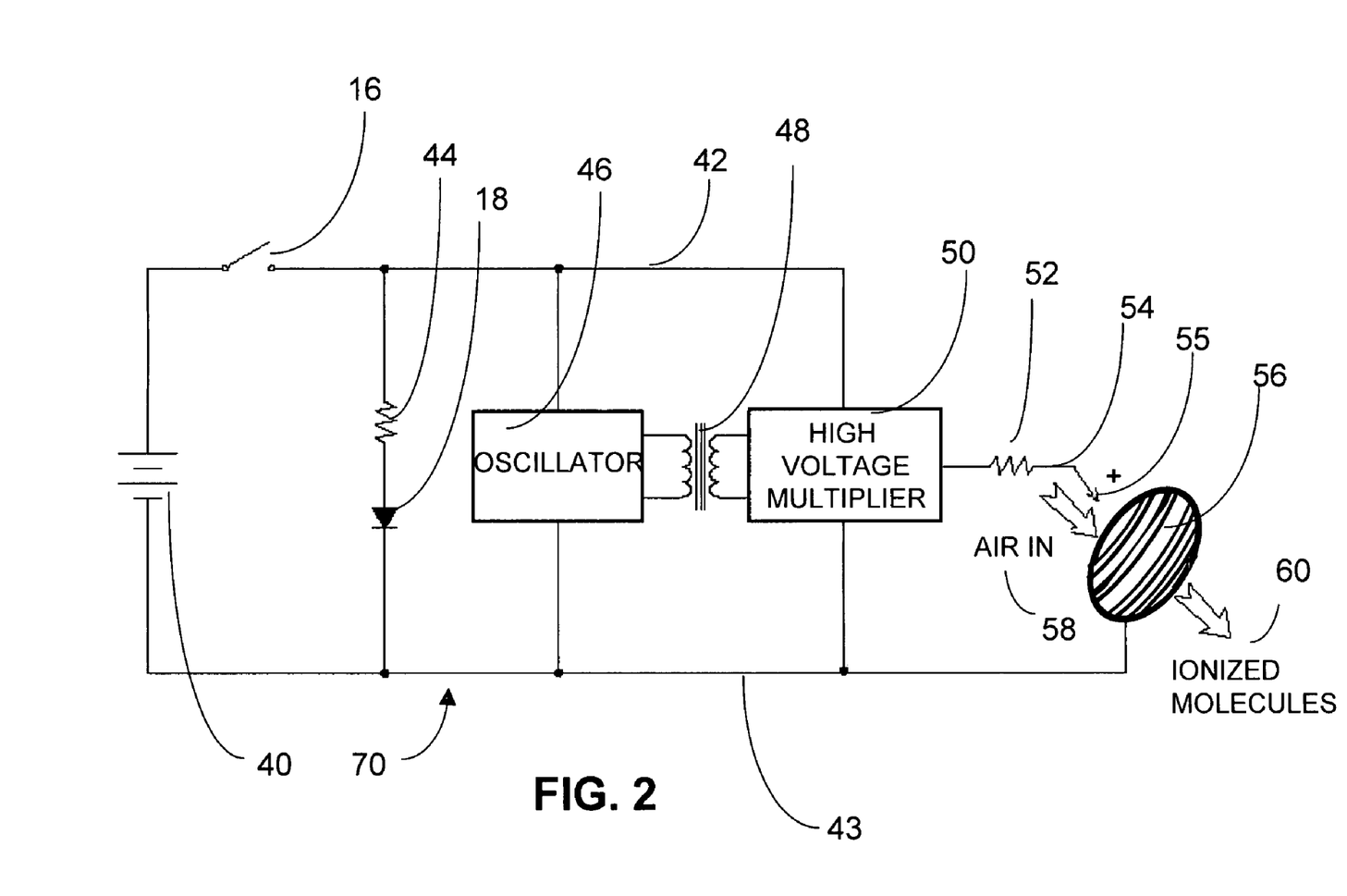
FIG. 2 is a circuit block diagram of a high voltage pulse generator in accordance with the present invention.

FIG. 2 is a circuit block diagram of a high voltage pulse generator 70 for generating ions. The battery 40, which can be two AA batteries, fits into handle 14 and provides power. Power on/off switch 16 switches power on/off to the ion generator, and when power is on, current flows through resistor 44 and light emitting diode 18, between power rail 42 and ground 43. The light emitting diode 18 lights up when power is switched on, providing a power on indication.

Oscillator 46 produces low voltage pulses, which are coupled to the input winding of step-up transformer 48, which produces voltage pulses of from 500 to 2000 volts on the output winding of the transformer 48. The output winding is then coupled to high voltage multiplier 50, which boosts the high voltage pulses to between 5 kV and 10 kV. The high voltage multiplier is accomplished with a circuit well known in the art that uses diodes and capacitors. This high voltage is then applied via resistor 52 to terminal 54 and then to first electrode 55. A second electrode 56 is at ground potential. The high voltage pulses at first electrode 55 produce an ionized air flow 60 past the second electrode 56. The ionized air also draws along non-ionized air towards the second electrode, which increases the overall air flow and provides a mix of ionized and non-ionized air flowing past second electrode 56.

The ionized air contributes to a "clean, outdoor" smell and taste, similar to the refreshing quality of the outside atmosphere following the passing of a thunderstorm. The ionized air in this application assists in killing of pathogens, oxidization of toxins produced by the pathogens, detoxification of chemical pollutants, and neutralization of allergens.

Figures 3, 4:
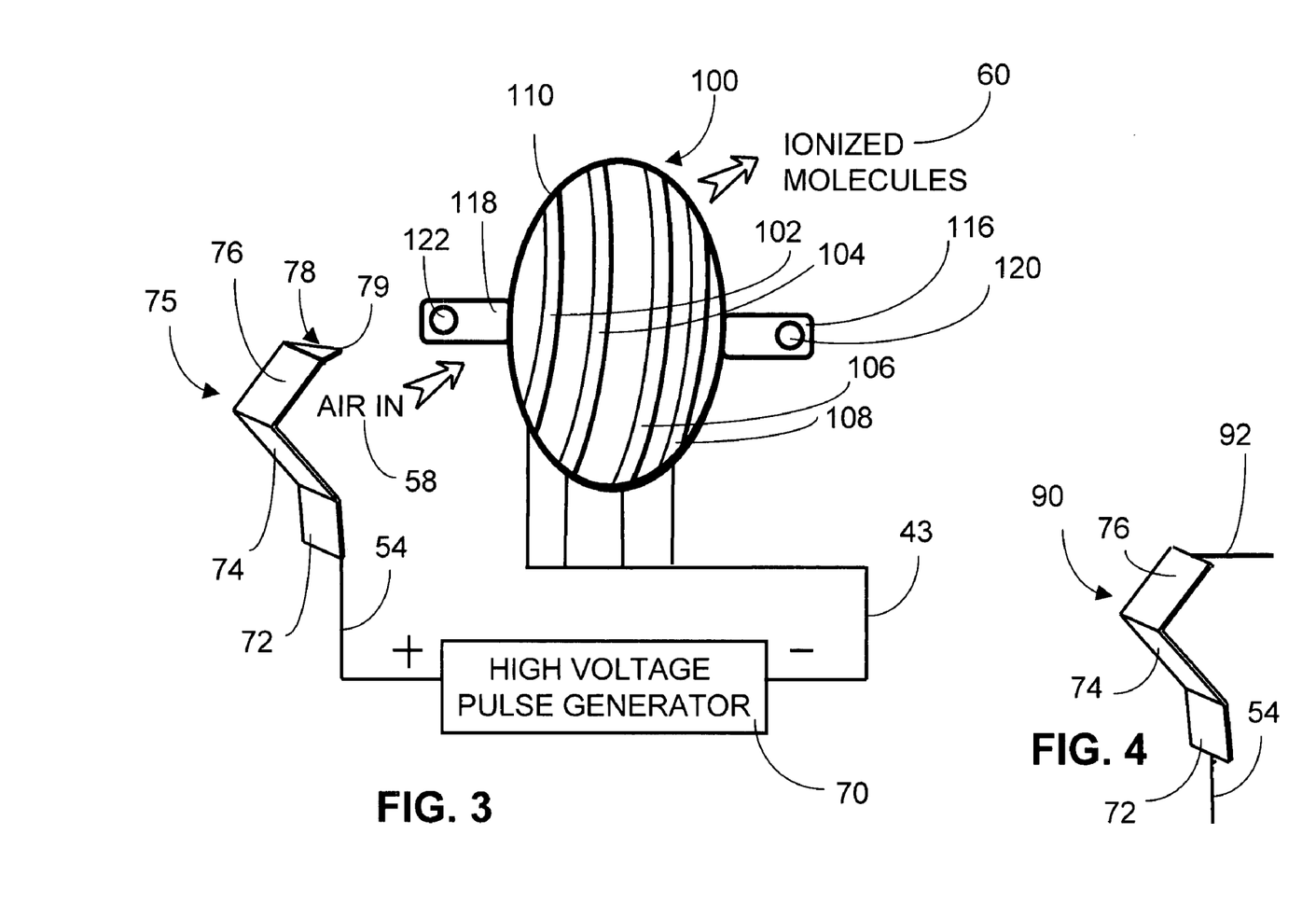
FIG. 3 is a diagram showing the first and second electrodes coupled to the high voltage pulse generator of the ionic pet groomer in accordance with the present invention.
FIG. 4 shows an alternate design for the first electrode in accordance with the present invention.

FIG. 3 is a diagram showing the first electrode 75 and the second electrode 100 coupled to the high voltage pulse generator 70. The first electrode 75 is connected to terminal 54 and electrically coupled to the high voltage pulse generator, while the second electrode is at ground potential 43.

The first electrode 75 is located in the ion pet groomer 10 below the air intake 20. The first electrode has a first plate 72, which is generally in a horizontal plane below the air intake 20. A second plate 74 is attached to the first plate and is tilted upward toward the air intake 20. A third plate 76 is attached to the second plate and is tilted downward away from the air intake 20. This arrangement provides strength for the electrode. One side of a triangular plate 78 is attached to the third plate 76 and a vertex 79 of the triangular plate is pointed toward the second electrode.

FIG. 4 shows an alternate implementation of the first electrode 75. The first electrode still has the first plate 72, which is generally in a horizontal plane below the air intake 20. The second plate 74 is attached to the first plate and is tilted upward toward the air intake 20. A third plate 76 is attached to the second plate and is tilted downward away from the air intake 20. However, rather than a triangular plate, a pin or needle 92 is attached to the third plate 76, and the pin or needle 92 is pointed toward the second electrode.

The second electrode 100 in FIG. 3 is located above the air outlet trough 26 and generally above or in the air outlet 25. The second electrode 100 is generally concave in shape as seen from the first electrode and is formed of a plurality of curved electrodes 102, 104, 106, and 108. Only four curved electrodes are shown; however, it is understood that more curved electrodes may be used. Each curved electrode is electrically coupled via line 43 to the high voltage generator 70. The curved electrodes are spaced apart and held in place by non-conductive frame 110. The spaces between the curved electrodes allow air flow between the curved electrodes to the air outlet trough 26 and thereby to the opening 34. The relative orientation of the first and second electrodes and the spacing of the curved electrodes 102, 104, 106, and 108 can be adjusted to produce the desired volume of ionized air. It is not necessary that the spacing of the curved electrodes 102, 104, 106, and 108 be uniform, and in FIG. 3 the spacing is shown as non-uniform; however, the spacing can be uniform. The length of each curved electrode 102, 104, 106, and 108 can be different in order to properly fit into non-conductive frame 110, which can be circular, an oval, rectangular, or any other desired shape. For example if the non-conductive frame is rectangular, then the curved electrodes would be uniform in length. It is also within the scope of this invention to have straight (non-curved) electrodes in a non-conductive frame.

To mount the second electrode 100, tabs 116 and 118 are attached to non-conductive frame 110. Holes 120 and 122 in tabs 116 and 118, respectively, provide for attachment to the ion pet groomer above or in the air outlet 25 with screws or rivets (not shown).

Figure 5:
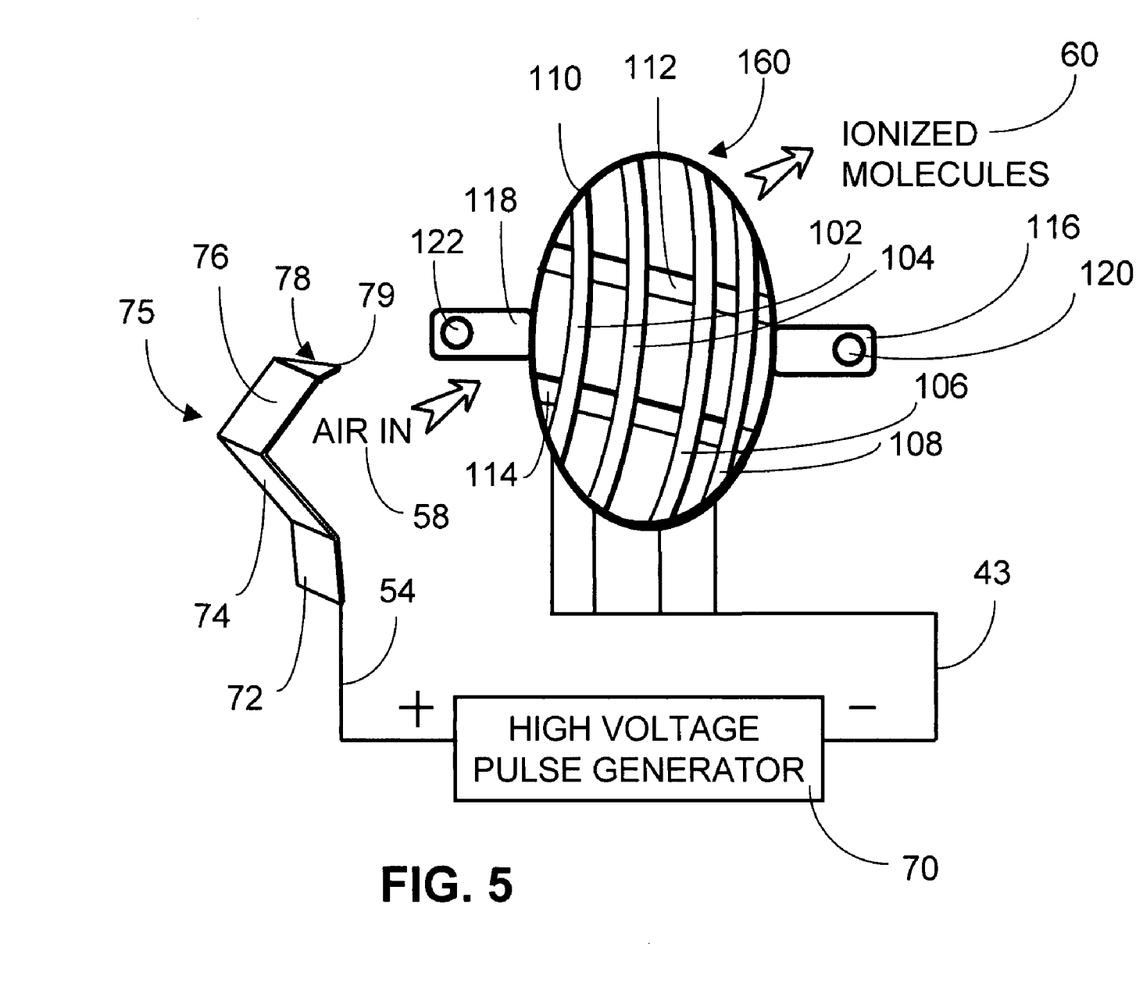
FIG. 5 is a diagram showing the first electrode and an second electrode with additional braces coupled to the high voltage pulse generator of the ionic pet groomer in accordance with the present invention.

FIG. 5 is a diagram showing the first electrode 75 and an alternate second electrode 160 coupled to the high voltage pulse generator 70. As before, the first electrode 75 is connected to terminal 54 and electrically coupled to the high voltage pulse generator, while the second electrode is at ground potential 43. It will be understood in the art that although in this description the second electrode is at ground potential, it could just as well be above ground potential, but below the voltage of the first electrode.

The first electrode 75 is the same as first electrode 75 in FIG. 3 and is located in the ion pet groomer 10 below the air intake 20. The first electrode can also have the configuration shown in FIG. 4, which has a pin or needle 92 rather than triangular plate 78 attached to the third plate 76. As before, the triangular plate 78 of first electrode 75, or pin 92 of first electrode 90 in the case of the first electrode configuration of FIG. 4, is pointed toward the second electrode 160.

The second electrode 160 in FIG. 3 is located above the air outlet trough 26 and generally above or in the air outlet 25. The second electrode 160 is generally concave in shape and formed of a plurality of curved electrodes 102, 104, 106, and 108. Only four curved electrodes are shown; however, it is understood that more may be used. Each curved electrode is electrically coupled via line 43 to the high voltage generator 70. The curved electrodes are spaced apart and held in place by non-conductive frame 110 and non-conductive braces 112 and 114 are also provided in this design for additional support.

As before, the spaces between the curved electrodes allow air flow between the curved electrodes to the air outlet trough 26 and thereby to the opening 34. The relative orientation of the first and second electrodes and the spacing of the curved electrodes 102, 104, 106, and 108 can be adjusted to produce the desired volume of ionized air. The spacing of the curved electrodes 102, 104, 106, and 108 is not necessary uniform; however can be uniform. By design the length of each curved electrode 102, 104, 106, and 108 may be different in order to properly fit into non-conductive frame 110, which can be circular, an oval, rectangular, or any other desired shape. For example, if the non-conductive frame is rectangular, then the curved electrodes would be uniform in length. It is also within the scope of this invention to have straight (non-curved) electrodes in a non-conductive frame.

To mount the second electrode 160, tabs 116 and 118 are attached to non-conductive frame 110. Holes 120 and 122 in tabs 116 and 118, respectively, provide for attachment to the ion pet groomer above or in the air outlet 25 with screws or rivets (not shown).

Figure 6:
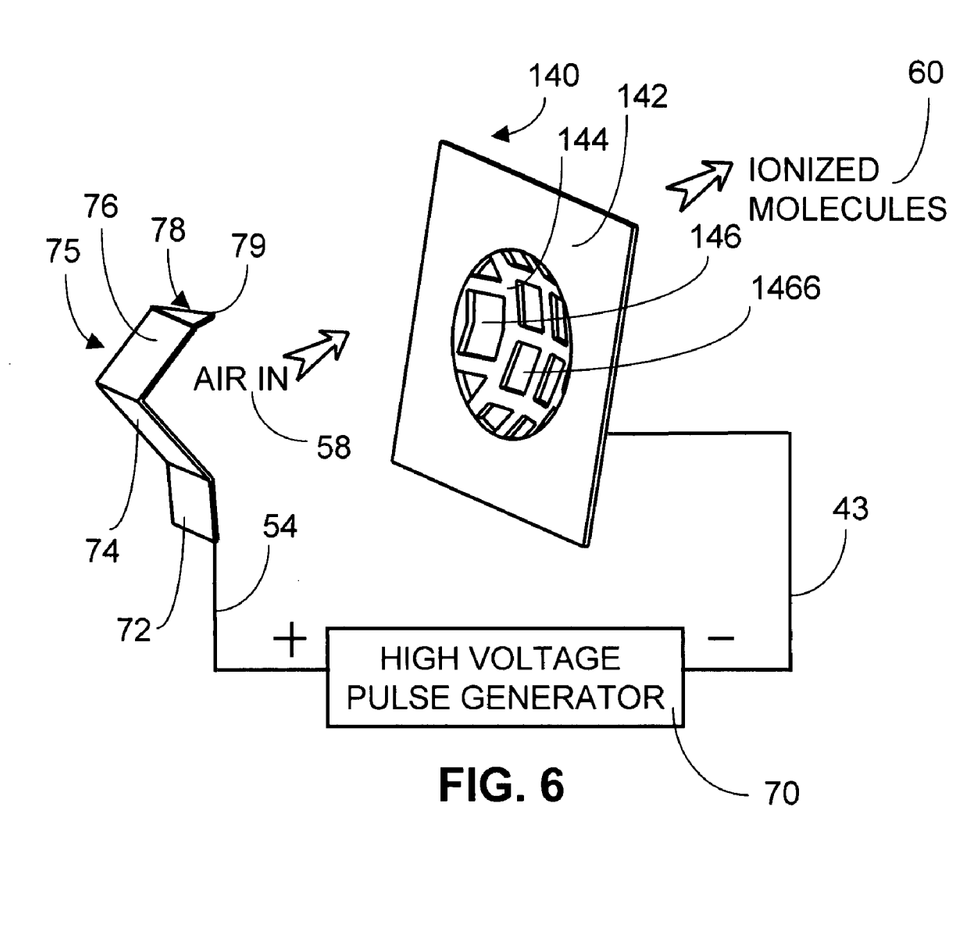
FIG. 6 is a diagram showing the first electrode and another alternate second electrode coupled to the high voltage pulse generator of the ionic pet groomer in accordance with the present invention.

In FIG. 6, shows second electrode 140 which is another alternate second electrode design. As in the other designs the second electrode 140 is located above the air outlet trough 26 and generally above or in the air outlet 25. The second electrode 140 is formed with a conductive plate 142, which has a conductive concave depression 144 facing the first electrode 75. The concave depression 144 has a pattern of rectangular openings 146 for allowing air to flow through the rectangular openings to the air outlet 25, and thereby to the air outlet trough 26 and opening 34. The second electrode is coupled via line 43 to high voltage generator 70.

The first electrode 75 is the same as first electrode 75 in FIG. 3 and is located in the ion pet groomer 10 below the air intake 20. The first electrode can also have the configuration shown in FIG. 4, which has a pin or needle 92 rather than triangular plate 78 attached to the third plate 76. As before, the triangular plate 78, or pin 92 in the case of the first electrode configuration of FIG. 4, is pointed toward the second electrode 140.

Figure 7:
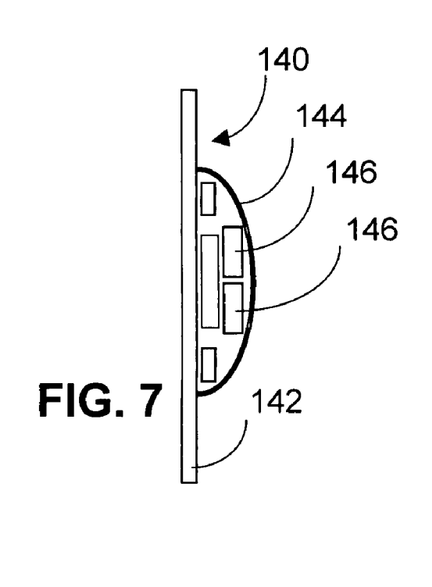
FIG. 7 is a side elevation view of the second electrode showing the concave depression in the plate and the pattern of rectangular openings in the concave depression for allowing air flow in accordance with the present invention.

FIG. 7 is a side elevation view of the second electrode 140 showing the concave depression 144 in the plate and the pattern of rectangular openings 146 in the concave depression for allowing air flow.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope of the present invention and additional fields in which the present invention would be of significant utility.

It is therefore intended by the appended claims to cover any and all such applications, modifications and embodiments within the scope of the present invention.

What is claimed is:

1. A handholdable ion emitting pet grooming brush, comprising:
   a body comprising:
      an air intake on a top side of said body;
      a bristle unit coupled to a bottom side of said body, said bristle unit having bristles adapted for brushing a pet and said bristles pointing away from said bottom side of said body;
      an air outlet trough on said bottom side of said body;
      an opening in a middle of said bristle unit, said opening aligned with said air outlet trough, said opening adapted to be similar in dimension to said air outlet trough; and
   an ion generator disposed in said body for creating an air flow that travels from said air intake to said air outlet trough, said ion generator comprising:
      a high voltage pulse generator;
      a first electrode, electrically coupled to said high voltage pulse generator, said first electrode located below said air intake; and
      a second electrode, electrically coupled to said high voltage pulse generator, said second electrode located above said air outlet trough, and said second electrode comprising:
         a plurality of nonuniformly spaced second electrodes each coupled to said high voltage generator;
      wherein said air flow includes ionized air traveling from said first electrode between and past said spaced second electrodes and through said opening in said middle of said bristle unit.

2. The handholdable ion emitting pet grooming brush of claim 1 further comprising a handle connected to said body and wherein:
   said body has a body length extending away from said handle and a body width wider than a width of said handle;
   said opening in said middle of said bristle unit has an opening length aligned with said body length, said opening length approximately fifty to seventy percent of said body length and said opening has an opening width approximately ten to fifteen percent of said body width.

3. The handholdable ion emitting pet grooming brush of claim 1 wherein:
   a width of said opening in said middle of said bristle unit narrows along a length of said opening; and
   a depth of said air outlet trough tapers along a length of said air outlet trough, such that said depth of said air outlet trough tapers to a shallower depth along said air outlet length to correspond to said width narrowing along said opening length.

4. The handholdable ion emitting pet grooming brush of claim 1 wherein:
   said opening in said middle of said bristle unit has a plurality of screen members coupled across said width of said opening to block debris from entering said opening.

5. The handholdable ion emitting pet grooming brush of claim 1 wherein said bristle unit is removably connected to said bottom side of said body.

6. The handholdable ion emitting pet grooming brush of claim 1 wherein each of said plurality of spaced second electrodes is held in alignment by a non-conductive frame.

7. The handholdable ion emitting pet grooming brush of claim 6 wherein said non-conductive frame is rectangular.

8. The handholdable ion emitting pet grooming brush of claim 6 wherein:
- each of said plurality of spaced second electrodes is curved toward said first electrode; and
- said non-conductive frame is oval.

9. The handholdable ion emitting pet grooming brush of claim 6 wherein:
- each of said plurality of spaced second electrodes is curved toward said first electrode; and
- said non-conductive frame is circular.

10. The handholdable ion emitting pet grooming brush of claim 7 further comprising:
- at least one nonconductive brace coupled to each of said plurality of spaced second electrodes for maintaining alignment of said space second electrodes.

11. The handholdable ion emitting pet grooming brush of claim 8 further comprising:
- at least one nonconductive brace coupled to each of said plurality of spaced second electrodes for maintaining alignment of said space second electrodes.

12. The handholdable ion emitting pet grooming brush of claim 9 further comprising:
- at least one nonconductive brace coupled to each of said plurality of spaced second electrodes for maintaining alignment of said space second electrodes.

13. The handholdable ion emitting pet grooming brush of claim 1 wherein said first electrode comprises a triangular plate.

14. The handholdable ion emitting pet grooming brush of claim 13 wherein said first electrode further comprises:
- a first plate generally horizontal to said air intake;
- a second plate attached to said first plate, said second plate tilted upward toward said air intake; and
- a third plate attached to said second plate, said third plate tilted downward away from said air intake;
- wherein one side of said triangular plate is attached to said third plate and a vertex of said triangular plate opposite to said one side is pointed toward said second electrode.

15. The handholdable ion emitting pet grooming brush of claim 1 wherein said first electrode comprises a pin.

16. The handholdable ion emitting pet grooming brush of claim 15 wherein said first electrode further comprises:
- a first plate generally horizontal to said air intake;
- a second plate attached to said first plate, said second plate tilted upward toward said air intake; and
- a third plate attached to said second plate, said third plate tilted downward away from said air intake;
- wherein said pin is attached to said third plate and is pointed toward said second electrode.

* * * * *